United States Patent
Nakanishi et al.

(10) Patent No.: US 8,933,602 B2
(45) Date of Patent: Jan. 13, 2015

(54) STATOR STRUCTURE AND STATOR MANUFACTURING METHOD

(75) Inventors: Koji Nakanishi, Konan (JP); Hideaki Takahashi, Nagoya (JP); Naoki Yoshida, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 261 days.

(21) Appl. No.: 13/380,370

(22) PCT Filed: Jun. 26, 2009

(86) PCT No.: PCT/JP2009/061700
§ 371 (c)(1),
(2), (4) Date: Dec. 22, 2011

(87) PCT Pub. No.: WO2010/150395
PCT Pub. Date: Dec. 29, 2010

(65) Prior Publication Data
US 2012/0091840 A1 Apr. 19, 2012

(51) Int. Cl.
*H02K 11/00* (2006.01)
*H02K 1/04* (2006.01)
*H02K 3/52* (2006.01)
*H02K 3/32* (2006.01)
*H02K 15/00* (2006.01)
*H02K 15/12* (2006.01)

(52) U.S. Cl.
CPC .............. *H02K 3/522* (2013.01); *H02K 3/325* (2013.01); *H02K 15/0081* (2013.01); *H02K 15/12* (2013.01)
USPC ............................................ 310/71; 310/43

(58) Field of Classification Search
CPC ............ H03K 3/04; H03K 3/50; H03K 5/225
USPC ............................................................ 310/71
See application file for complete search history.

(56) References Cited

U.S. PATENT DOCUMENTS

2007/0085531 A1* 4/2007 Ijima ........................ 324/207.25
2007/0170792 A1* 7/2007 Bott et al. ....................... 310/71
2008/0136274 A1* 6/2008 Fujii et al. ...................... 310/71

(Continued)

FOREIGN PATENT DOCUMENTS

| JP | 2001-103700 A | 4/2001 |
| JP | 2004-064954 A | 2/2004 |
| JP | 2006-246594 A | 9/2006 |

(Continued)

OTHER PUBLICATIONS

Machine Translation, Shingo et al., JP 2001103700 A, Apr. 13, 2001.*

(Continued)

*Primary Examiner* — Quyen Leung
*Assistant Examiner* — Thomas Truong
(74) *Attorney, Agent, or Firm* — Kenyon & Kenyon LLP

(57) ABSTRACT

To provide a stator structure or a stator manufacturing method capable of providing a short coil end, a stator structure includes a coil mounted on a stator core part and a resin-molded portion made of insulating resin that covers at least an end face of the core part and the coil. This structure includes a bus bar joined to a first coil terminal portion (a second coil terminal portion) formed in an end of the coil. The bus bar is placed so that a wide surface of the bus bar faces an end face of the resin-molded portion.

10 Claims, 13 Drawing Sheets

(56) References Cited

U.S. PATENT DOCUMENTS

2009/0140595 A1\* 6/2009 Naganawa et al. ............ 310/201
2010/0194214 A1\* 8/2010 Takahashi et al. .............. 310/43

FOREIGN PATENT DOCUMENTS

| JP | 2008-148481 A | 6/2008 |
| JP | 2008-278704 A | 11/2008 |
| JP | 2009-072055 A | 4/2009 |
| JP | 2009-089456 A | 4/2009 |
| WO | WO 2009041172 A2 \* | 4/2009 |
| WO | 2011/155059 A1 | 12/2011 |

OTHER PUBLICATIONS

Machine Translation, Takahashi et al., JP 2009089456 A, Apr. 23, 2009.\*

International Search Report of PCT/JP2009/061700 mailed Sep. 15, 2009.

\* cited by examiner

STATOR STRUCTURE AND STATOR MANUFACTURING METHOD

CROSS-REFERENCE TO RELATED APPLICATIONS

This is a 371 national phase application of PCT/JP2009/061700 filed on 26 Jun. 2009, the entire contents of which are incorporated herein by reference.

FIELD OF THE INVENTION

The present invention relates to a technique related to a structure of a bus bar of a stator to be used in an electric motor and a manufacturing method thereof to achieve shortening of a coil end.

BACKGROUND OF THE INVENTION

There are recently increasing demands for high-powered and small-sized drive motors to be mounted in hybrid electric vehicles and others. For this purpose, a method of forming a coil by edgewise bending a flat rectangular conductor having a rectangular cross section (a "flat rectangular conductor") has been studied.

The use of the flat rectangular conductor makes it possible to increase the cross sectional area of the conductor and improve the space factor. As the conductor has a wider cross sectional area, the resistance decreases, thus suppressing heat generation in a motor. However, a demerit of this configuration is difficulty in winding.

Further, a coil formed of the flat rectangular conductor or a coil formed of a conductor wire having a circular cross section needs to be connected with a bus bar in a coil end. For this purpose, various methods of connecting a conductor and a bus bar in a coil end have also been studied.

Patent Document 1 discloses a welding structure of a bus bar and a welding method thereof.

An end of a wire having a circular cross section exposed on a coil end is provided as an end portion of a coil wound in a core assembly. A bus bar engaged with this wire end is formed with a slit at its distal end. When the slit and the wire end are engaged, the coil forms an electric circuit of a rotary electric machine. The wire end is inserted in the slit of the bus bar and then welded to engage with the bus bar.

Patent Document 2 discloses a technique related to a connecting method with respect to a terminal.

A plurality of U-shaped coils are inserted in a stator core and bus bar plates each formed with cutouts are joined to cylindrical terminal portions formed in a coil end of each U-shaped coil, thereby forming an electric circuit of the coils. The joining is performed by TIG welding or other techniques.

RELATED ART DOCUMENTS

Patent Documents

Patent Document 1: JP2004-064954A
Patent Document 2: JP2008-148481A

SUMMARY OF THE INVENTION

Problems to be Solved by the Invention

However, Patent Documents 1 and 2 may have the following disadvantages.

Every wire used in Patent Documents 1 and 2 is coated with an insulating coating for making insulation with respect to the stator cores. An insulating coating material may include insulating resin materials such as enamel coating, polyurethane, and polyimide-amide. In the case of performing welding in a coil terminal portion, however, the heat generated during welding may damage those insulating coatings.

To prevent such defects, under present circumstances, a conductor wire is exposed by a fixed length on the coil end portion and welded.

However, this configuration causes a problem with an increase in size of the coil end portions.

Drive motors to be mounted on vehicles are demanded especially for reduction in size in relation to placement in an engine room. For hybrid electric vehicles, particularly, drive motors are demanded for size reduction to allow install both an engine and a drive motor in an engine room.

It is therefore essential to shorten a coil end to achieve size reduction of a motor. Thus, development of technologies to shorten a coil end has been anticipated.

The present invention has been made to solve the above problems and has a purpose to provide a stator structure with a shortened coil end or a stator manufacturing method capable of shortening a coil end.

Means of Solving the Problems

To achieve the above purpose, one aspect of the invention provides a stator structure having the following configurations.

(1) In a stator structure comprising: a coil mounted on a stator core part; and a molded portion made of insulating resin that covers at least an end face of the stator core part and the coil, the stator structure includes a bus bar joined to a coil terminal portion formed in an end portion of the coil, and the bus bar is placed so that a wide surface of the bus bar faces the end face of the molded portion, and a bus bar terminal portion formed in each end portion of the bus bar has a surface placed in surface contact with a surface of the molded portion near an engagement portion with at least the coil terminal portion.

(2) In the stator structure in (1), the molded portion is made of a resin material having high heat conductivity.

(3) In the stator structure in (1), the molded portion is made of a resin material having high heat conductivity, and the coil terminal portion is bent toward the coil and a surface of the coil terminal portion is in surface contact with the surface of the molded portion.

(4) In the stator structure in (1) or (2), the bus bar terminal portion of the bus bar is formed with a slit engageable with the coil terminal portion of the coil, and the coil terminal portion is inserted in the slit.

(5) In the stator structure in one of (1) to (4), a surface of a bus bar body portion joining the bus bar terminal portions formed in both ends of the bus bar is in surface contact with the surface of the molded portion.

To achieve the above purpose, another aspect of the invention provides a stator manufacturing method having the following characteristics.

(6) In a method of manufacturing a stator by mounting coils on stator core parts and resin-molding the stator core parts and the coils together to form molded portions, the method comprises the steps of: bending coil terminal portions formed in ends of the coils toward the molded portions; bonding surfaces of the coil terminal portions to surfaces of the molded portions with an adhesive; and welding the coil terminal portion of a first coil of the coils mounted on the stator core parts to one end of a bus bar and welding the coil terminal portion of a second coil to the other end of the bus bar.

(7) In a method of manufacturing a stator by mounting a coil on a stator core part and resin-molding the stator core part and the coil together to form molded portion, the method comprises the steps of: applying an adhesive to a bonding surface formed as a part of a surface of the molded portion and around a coil terminal portion formed in an end of the coil; placing a bus bar on an end face of the molded portion, the bus bar being welded to the coil terminal portion, to bond a surface of a bus bar terminal portion formed in each end of the bus bar to the bonding surface; and welding the coil terminal portion to the bus bar terminal portion.

(8) In a method of manufacturing a stator by mounting coils on stator core parts and resin-molding the stator core parts and the coils together to form molded portions, the method comprises the steps of: bending coil terminal portions formed in ends of the coils toward the coils; resin-molding the coils and the stator core parts together to form the molded portions so that one surface of each coil terminal portion facing the coils is embedded in the molded portions while the other surface of each coil terminal portion protrudes out of the molded portions; and welding the coil terminal portion of a first coil of the coils mounted on the stator core parts to one end of a bus bar and welding the coil terminal portion of a second coil to the other end of the bus bar.

Effects of the Invention

The stator structure in one aspect of the invention having the above configurations can provide the following operations and effects.

The aspect in (1) provides a stator structure comprising: a coil mounted on a stator core part; and a molded portion made of insulating resin that covers at least an end face of the stator core part and the coil, wherein the stator structure includes a bus bar joined to a coil terminal portion formed in an end portion of the coil, and the bus bar is placed so that a wide surface of the bus bar faces the end face of the molded portion, and a bus bar terminal portion formed in each end portion of the bus bar has a surface placed in surface contact with a surface of the molded portion near an engagement portion with at least the coil terminal portion.

In the conventional art, as mentioned in the problems, the coil terminal portion is exposed by a fixed length on the coil end portion and is joined to the bus bar with its wide surface in a vertical state to the end face of the stator. This results in a problem with a large size of the coil end portion. Herein, assuming that the bus bar is for example a conductor having a rectangular cross section, the wide surface of the bus bar represents a surface including a long side of the cross section of the bus bar.

However, in the present invention, the bus bar is placed with its wide surface facing the end face of the molded portion, i.e., the end face of the stator. When the wide surface of the bus bar is laid along the end face of the stator and the bus bar is welded to the coil terminal portion, the coil end of the stator can be shortened by at least an amount corresponding to the width of the bus bar.

An outer surface of the bus bar terminal portion and an outer surface of the molded portion are in surface contact with each other. Accordingly, the heat generated when the bus bar terminal portion and the coil terminal portion are welded can be dissipated into the molded portion.

The bus bar terminal portion and the coil terminal portion are joined, for example, by arc welding. However, there is the aforementioned problem that the heat generated in welding may damage the insulating film or layer that coats the coil.

However, since the bus bar terminal portion is welded in surface contact with the molded portion, the heat generated during welding will promptly transfer to the molded portion and dissipate into the molded portion. As a result, a peak temperature during welding can be reduced.

By reducing the peak temperature during welding, it is possible to prevent damages to the insulating film or layer that coats the bus bar or the coil.

This can achieve shortening of the length of the coil terminal portion which would have a predetermined length to prevent damage to the insulating coating provided on the coil by the heat and damages to the molded portion by the heat.

Accordingly, the length of the coil terminal portion can be set optimum, thus contributing to cost reduction of the stator.

The aspect in (2) provides, in the stator structure in (1), that the molded portion is made of a resin material having high heat conductivity.

When the stator core and the coil are to be resin-molded, a resin material having high heat conductivity is used and an outer surface of the bus bar terminal portion and an outer surface of the molded portion are in surface-contact with each other. Accordingly, the heat generated when the bus bar terminal portion and the coil terminal portion are joined can be dissipated into the molded portion.

The aspect in (3) provides, in the stator structure in (1), that the molded portion is made of a resin material having high heat conductivity, and the coil terminal portion is bent toward the coil and a surface of the coil terminal portion is in surface contact with the surface of the molded portion.

Unlike the aspect in (2), the aspect in (3) provides a configuration that the coil terminal portion, not the bus bar terminal portion, is placed in surface contact with the surface of the molded portion. However, the bus bar terminal portion contacts with the molded portion through the coil terminal portion. Thus, the aspect (3) is identical to the aspect (2) in an increase in a portion in surface contact with the molded portion to thereby contribute to dissipation of the heat generated into the coil terminal portion during welding.

Since the bus bar terminal portion is in surface contact with the molded portion through the coil terminal portion, the heat generated when the bus bar terminal portion and the coil terminal portion are welded can be efficiently dissipated into the molded portion.

The coil terminal portion in a bent state toward the molded portion is joined to the bus bar terminal portion, thus providing a short coil end, which contributes to size reduction of the stator.

The aspect in (4) provides, in the stator structure in (1) or (2), that the bus bar terminal portion of the bus bar is formed with a slit engageable with the coil terminal portion of the coil, and the coil terminal portion is inserted in the slit.

When the coil terminal portion is inserted in the slit formed in the bus bar terminal portion, positioning of the bus bar can be facilitated. This enables joining between the coil terminal portion and the bus bar terminal portion without using a jig. Thus, cost reduction can be achieved.

In the case where the coil terminal portion and the bus bar terminal portion are to be joined by welding, a merit is provided that the bus bar terminal portion itself can protect against sparks or the like generated during welding.

The aspect in (5) provides, in the stator structure in one of (1) to (4), that a surface of a bus bar body portion joining the bus bar terminal portions formed in both ends of the bus bar is in surface contact with the surface of the molded portion.

The surface of the bus bar body portion, as well as the bus bar terminal portions, is in surface contact with the surface of the molded portion. It is therefore possible to further enhance the release or dissipation efficiency of heat generated in welding the bus bar terminal portion and the coil terminal portion.

Since the surface of the bus bar body portion is also in surface contact with the surface of the molded portion, almost the entire one surface of the bus bar as well as the bus bar terminal portions is in contact with the end face of the molded portion. Accordingly, the heat dissipation area can be greatly increased and thus the heat dissipation efficiency can also be enhanced.

This can contribute to improvement of heat dissipation efficiency of the stator.

Further, another aspect of the invention having the above configurations can provide the following operations and effects.

In the aspect in (6), a method of manufacturing a stator by mounting coils on stator core parts and resin-molding the stator core parts and the coils together to form molded portions comprises the steps of: bending coil terminal portions formed in ends of the coils toward the molded portions; bonding surfaces of the coil terminal portions to surfaces of the molded portions with an adhesive; and welding the coil terminal portion of a first coil of the coils mounted on the stator core parts to one end of a bus bar and welding the coil terminal portion of a second coil to the other end of the bus bar.

The coil terminal portion is bent and surface-bonded to the surface of the molded portion with an adhesive. Accordingly, when the coil terminal portion and the bus bar terminal portion are to be welded, the heat generated during welding is allowed to efficiently dissipate into the molded portion side.

It is therefore possible to mitigate the influence of the heat generated during welding and achieve a low peak temperature of the heat generated in the coil terminal portion during welding.

Since the coil terminal portion and the molded portion are surface-bonded to each other with an adhesive, an air layer or the like is less likely to occur and smooth heat transfer is enabled. In the case where the molded portion is made of high-conductivity resin, a low peak temperature of the heat generated in welding the coil terminal portion and the bus bar terminal portion is more effectively achieved.

Since the peak temperature can be low, it is possible to prevent thermal damage to the insulating film or layer that coats the coil. Further, the coil terminal portion is bent and then joined to the bus bar, so that the coil end of stator can have a short coil end, contributing to size reduction of the stator.

In the aspect in (7), a method of manufacturing a stator by mounting a coil on a stator core part and resin-molding the stator core part and the coil together to form molded portion comprises the steps of: applying an adhesive to a bonding surface formed as a part of a surface of the molded portion and around a coil terminal portion formed in an end of the coil; placing a bus bar on an end face of the molded portion, the bus bar being welded to the coil terminal portion, to bond a surface of a bus bar terminal portion formed in each end of the bus bar to the bonding surface; and welding the coil terminal portion to the bus bar terminal portion.

The bus bar terminal portion and the bonding surface are bonded to each other and thus the bus bar terminal portion is surface joined to the molded portion. This can achieve a reduction in peak temperature of the heat generated in welding the bus bar terminal portion and the coil terminal portion.

This reduction in peak temperature enables the coil terminal portion to have a short length. As a result, the coil end of the stator can have a reduced size.

In the aspect in (8), a method of manufacturing a stator by mounting coils on stator core parts and resin-molding the stator core parts and the coils together to form molded portions comprises the steps of: bending coil terminal portions formed in ends of the coils toward the coils; resin-molding the coils and the stator core parts together to form the molded portions so that one surface of each coil terminal portion facing the coils is embedded in the molded portions while the other surface of each coil terminal portion protrudes out of the molded portions; and welding the coil terminal portion of a first coil of the coils mounted on the stator core parts to one end of a bus bar and welding the coil terminal portion of a second coil to the other end of the bus bar.

The aspect in (8), which is similar to the aspect in (6) in bending the coil terminal portion, is achieved by forming the molded portion after bending the coil terminal portion. Therefore, the process of bonding the coil terminal portion to the surface of the molded portion is no longer necessary. More cost reduction can be realized than in the stator formed in the aspect in (6).

Since the molded portion is formed after the coil terminal portion is bent, gaps are less likely to occur between the bent portion of the coil terminal portion and the molded portion. This enhances the heat dissipation efficiency. It is expected to achieve a low peak temperature of the heat generated in welding the coil terminal portion and the bus bar.

DETAILED DESCRIPTION

A detailed description of a first preferred embodiment of the present invention will now be given referring to the accompanying drawings.

First Embodiment

Figure 1:
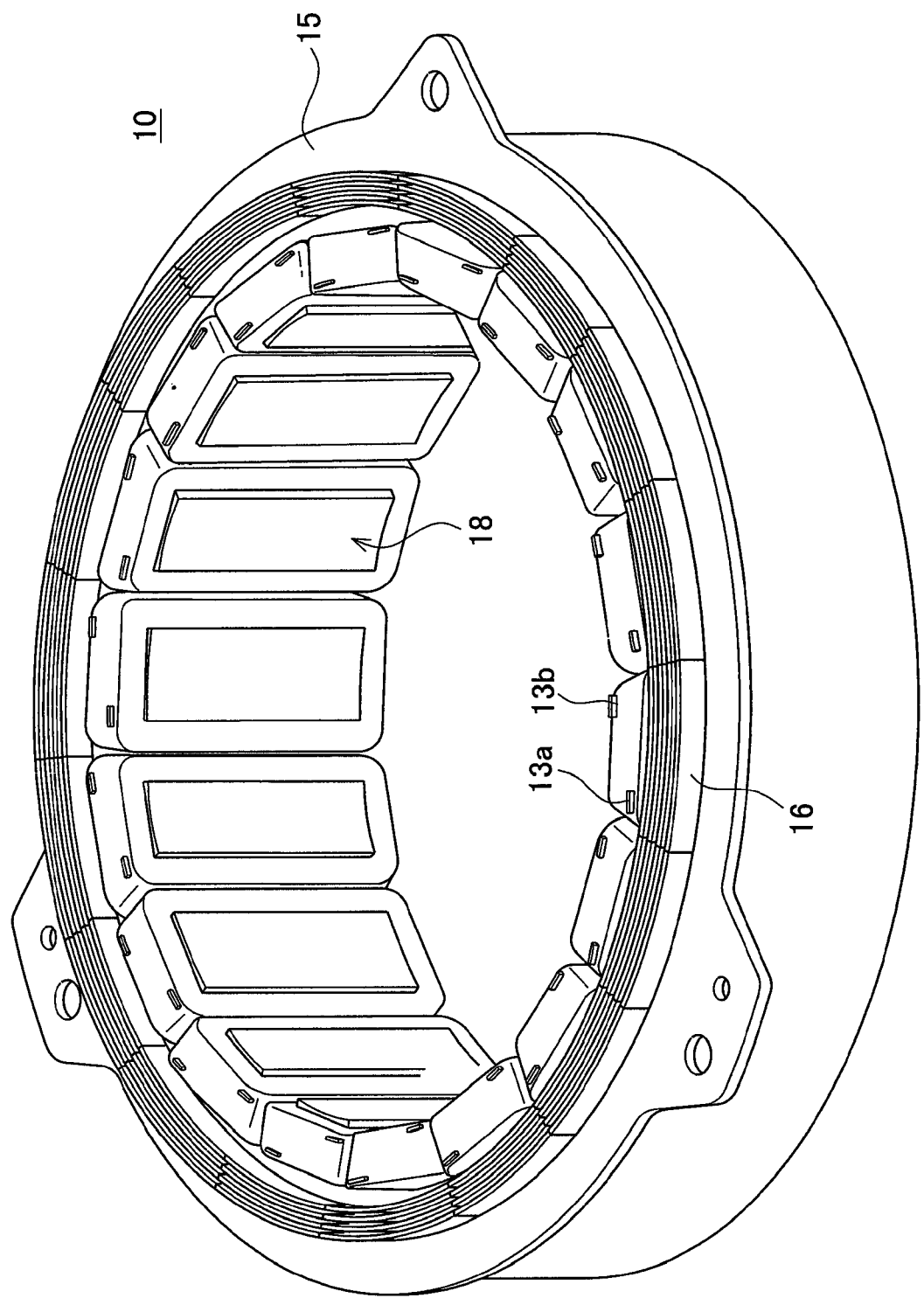
FIG. 1 is a perspective view of a stator in a first embodiment.

FIG. 1 is a perspective view of a stator. For convenience of explanation, a split-type stator unit ("stator unit") is illustrated in a simplified shape and in a condition before connection with connecting wires.

A stator 10 is a split-type stator including stator units 18, an outer ring 15 placed around the stator units 18, and a bus bar holder 16.

Figure 2:
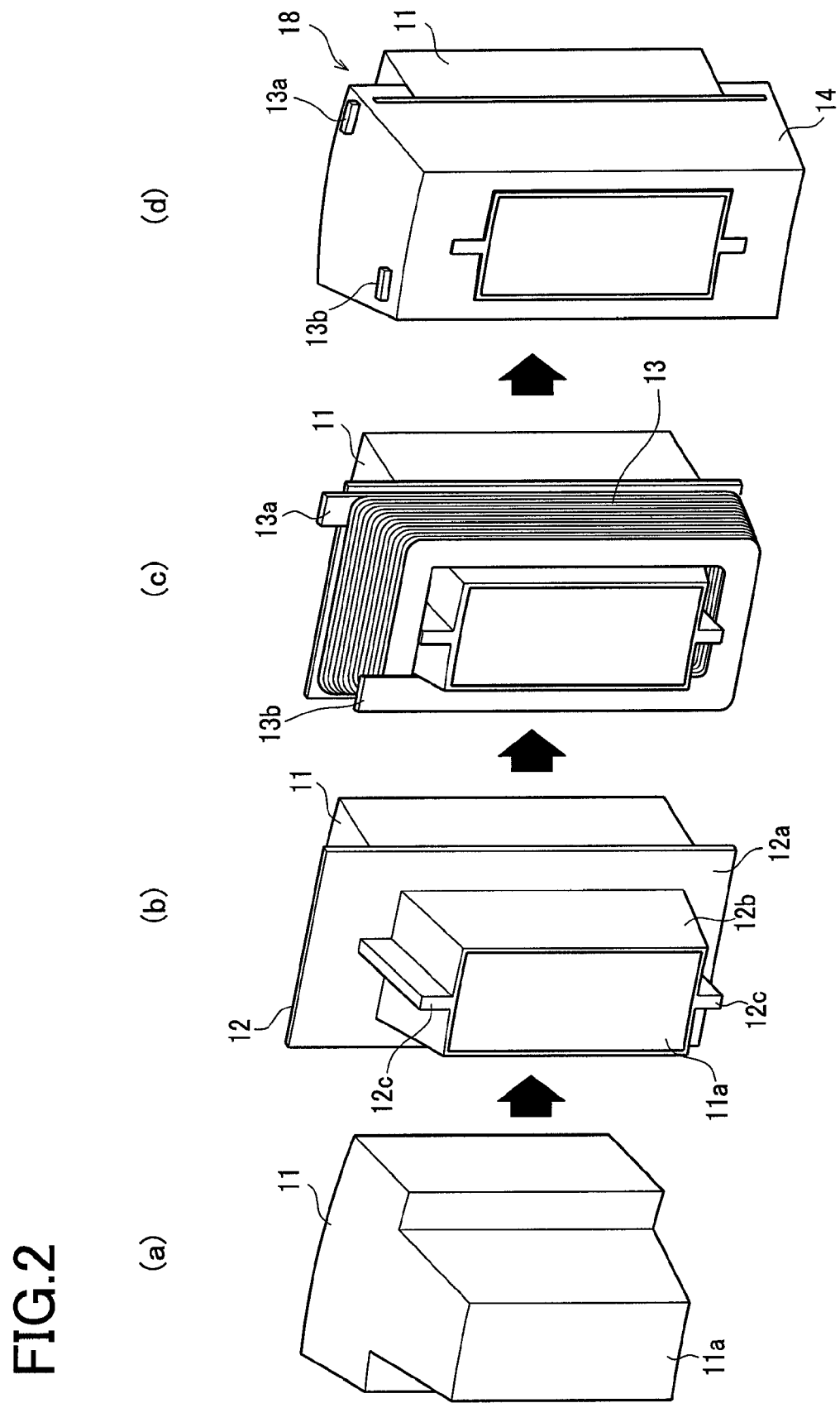
FIG. 2 are perspective views of the first embodiment; (a) shows a split-type stator core part, (b) shows a state where an insulator is fitted on the core part, (c) shows a state where a coil is mounted on the core part, and (d) shows a state where a coil portion of the core part is resin-molded.

FIG. 2 are perspective views; (a) shows a split-type stator core part ("core part"), (b) shows a state where an insulator is fitted on the core part, (c) shows a state where a coil is mounted on the core part, and (d) shows a state where a coil portion of the core part is resin-molded.

A split-type stator core 11 is formed of laminated magnetic steel sheets each being produced by press. The core part 11 includes a teeth portion 11a on which an insulator 12 is fitted. The insulator 12 includes a base portion 12a having a flat plate-like shape, a sleeve portion 12b having a shape conforming with the outer periphery of the teeth portion 11a, and support columns 12c for supporting the inner periphery of a coil 13.

The insulator 12 is fitted and placed on the core part 11 and then the coil 13 is mounted thereon in a position as shown in FIG. 2(c).

The coil 13 is formed of a flat rectangular conductor having a rectangular cross section by edgewise bending. This coil 13 includes a first coil terminal portion 13a and a second coil terminal portion 13b for connection with a bus bar 25 mentioned later.

While the insulator 12 and the coil 13 are set on the core part 11, the outer periphery of the coil 13 is covered with resin by molding. This condition is shown in FIG. 2(d). A resin-molded portion 14 is formed around the coil 13.

The stator units 18 formed as above are arranged in a cylindrical shape. The split number in the first embodiment is 18 and thus eighteen stator units 18 are arranged.

In this state, the preheated outer ring 15 is disposed so that the inner periphery of the outer ring 15 contacts with the outer periphery of the stator units 18. The outer ring 15 is then cooled. Since the internal diameter of the outer ring 15 increases when the outer ring 15 is heated and decreases when cooled, the outer ring 15 is shrink-fitted on the outer periphery of the stator units 18 to hold them.

The stator units 18 are thus held in a circular configuration by the outer ring 15. Then, the bus bar holder 16 is placed on an end of the stator 10. Thereafter, the first coil terminal portions 13a and the second coil terminal portions 13b of the coils 13 are connected to form a U phase, a V phase, and a W phase of the stator 10. In this way, the stator 10 is completed as shown in FIG. 1.

Figure 3:
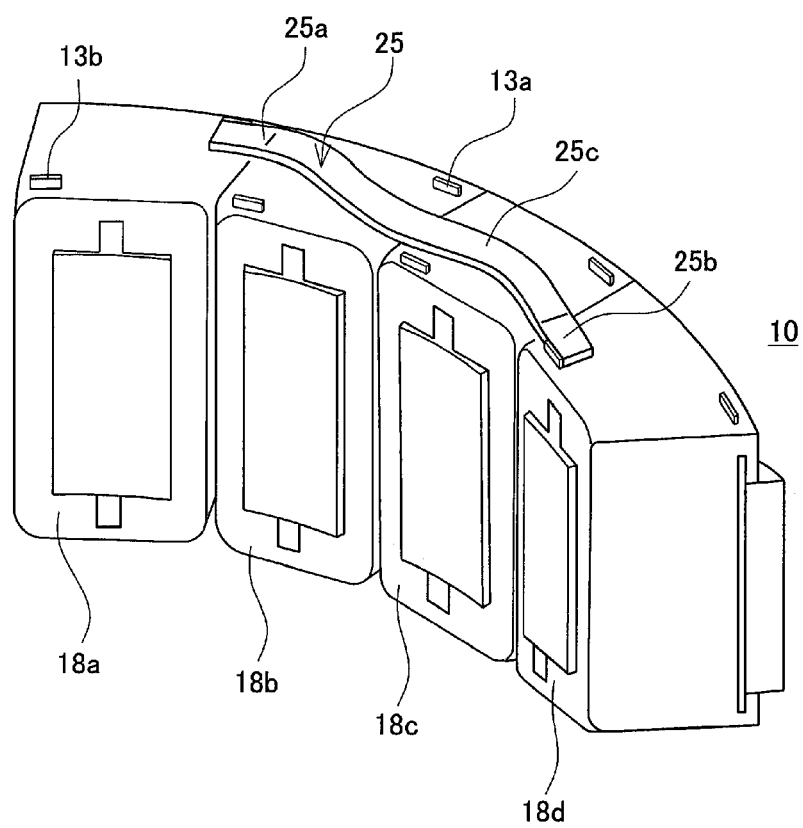
FIG. 3 is a perspective view showing a manner of connecting terminals of coils by a connecting wire in the first embodiment.

FIG. 3 is a perspective view showing a manner of connecting terminals of the coils with a connecting wire. In FIG. 3, for descriptive purposes, the stator units 18 are referred to as a first unit 18a, a second unit 18b, a third unit 18c, and a fourth unit 18d. Only a part of the stator 10 is illustrated and thus the outer ring 15 is omitted from the figure.

The bus bar 25 is a wire for electrically connecting one first coil terminal portion 13a and one second coil terminal portion 13b each protruding from the stator units 18 and is a bus bar made of metal such as copper having a good conductivity and covered with insulating coating. Both ends of the bus bar 25 are provided respectively with a first bus bar terminal portion 25a and a second bus bar terminal portion 25b both of which are not covered with the insulating coating. A portion between the first terminal portion 25a and the second terminal portion 25b is referred to as a bus bar body portion 25c for convenience' shake.

Figure 4:
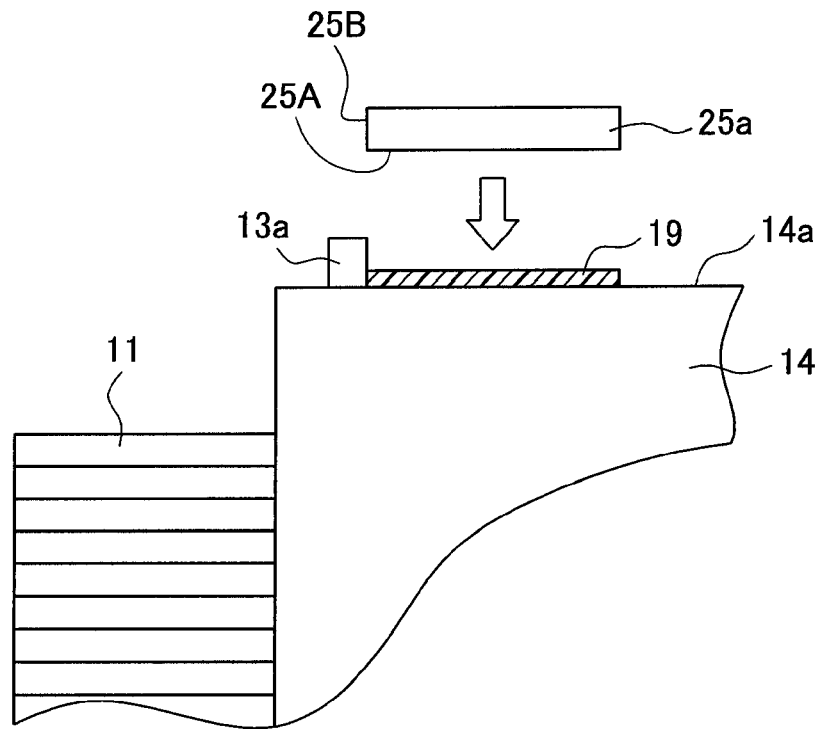
FIG. 4 is a side view to explain a joining portion between a bus bar terminal portion and a coil terminal portion in the first embodiment.

FIG. 4 is a side view to explain a joining portion between the bus bar terminal portion and the coil terminal portion.

Figure 5:
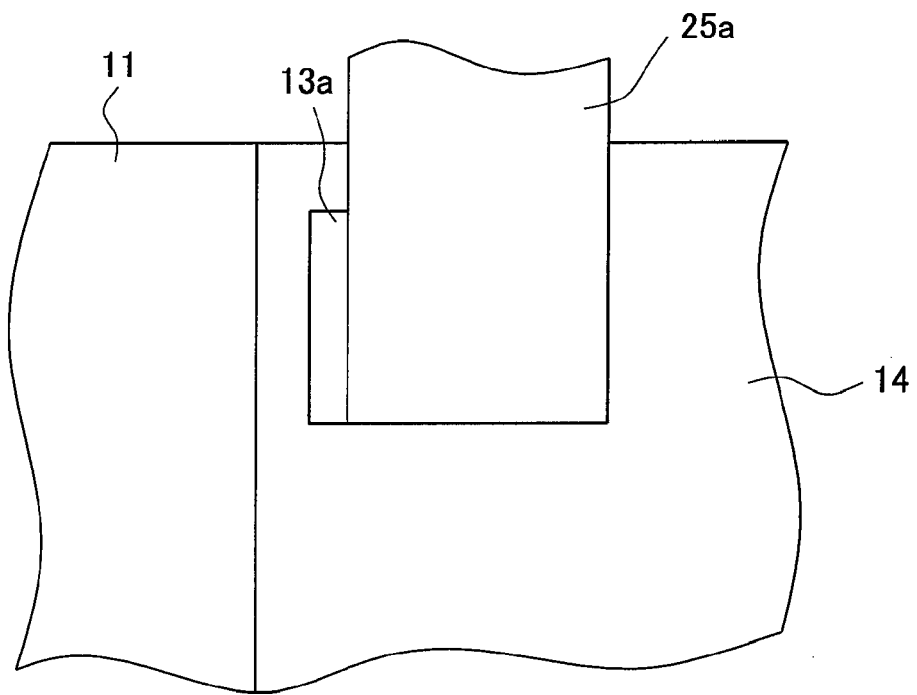
FIG. 5 is a top view to explain the joining portion between the bus bar terminal portion and the coil terminal portion in the first embodiment.

FIG. 5 is a top view to explain the joining portion between the bus bar terminal portion and the coil terminal portion.

Before the bus bar 25 is placed on an end face 14a which is a top surface of the stator 10, an adhesive 19 is applied beside the first coil terminal portion 13a and on a part of the end face 14a with which the first bus bar terminal portion 25a is placed in contact.

After the adhesive 19 is applied, the bus bar 25 is put in a position as shown in FIG. 3. At that time, it is necessary to position the bus bar 25 by a jig not shown.

The first coil terminal portion 13a is joined to the first bus bar terminal portion 25a, and the second coil terminal portion 13b is joined to the second bus bar terminal portion 25b.

Figure 6:
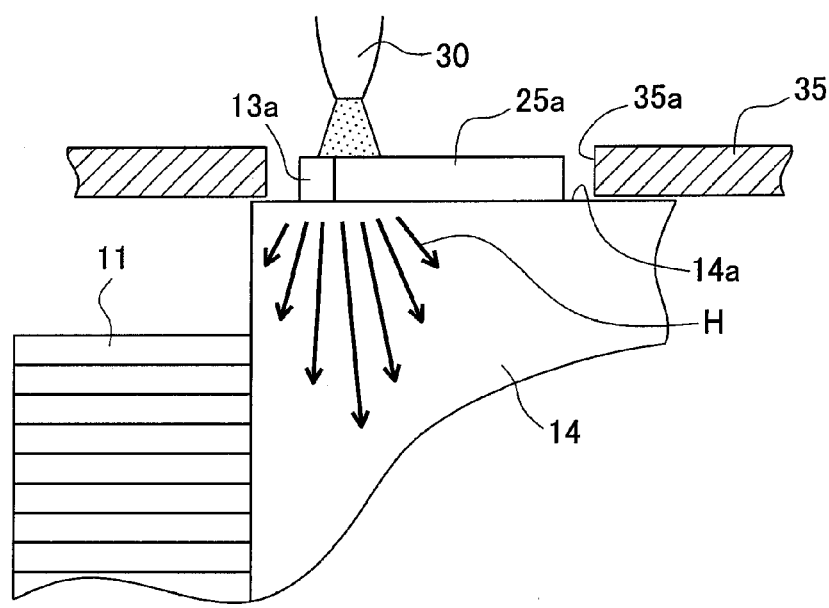
FIG. 6 is a side view to explain a manner of welding the bus bar terminal portion and the coil terminal portion in the first embodiment.

FIG. 6 is a side view to explain a manner of joining the bus bar terminal portion and the coil terminal portion.

The bus bar 25 is electrically connected by welding to the first coil terminal portion 13a or the second coil terminal portion 13b of the coil 13.

Figure 14:
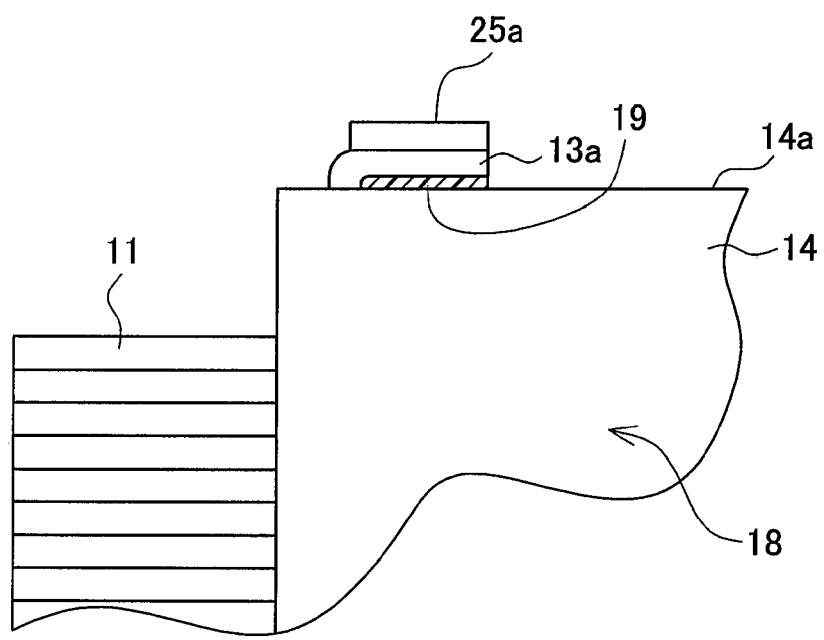
FIG. 14 is a side view to explain a joining portion between a bus bar terminal portion and a coil terminal portion in a fourth embodiment.

For joining the first coil terminal portion 13a and the first bus bar terminal portion 25a, a wide surface 25A contacts with the end face 14a as shown in FIG. 14 and thus a side surface 25B is joined to the surface of the first coil terminal portion 13a.

For welding, a torch 30 is used. In welding, a welding jig 35 is also used. The welding jig 35 includes a disk plate not shown formed with a through hole 35a in a position above a position in which the first bus bar terminal portion 25a or the second bus bar terminal portion 25b is to be placed. With the torch 30, the first coil terminal portion 13a and the first bus bar terminal portion 25a are welded through the through hole 35a.

Welding between the first coil terminal portion 13a and the first bus bar terminal portion 25a is performed as above. Similarly, welding between the second coil terminal portion 13b and the second bus bar terminal portion 25b is also conducted.

Even though explanation is omitted, the bus bar 25 is held by a jig not shown during welding.

As shown in FIG. 3, the first coil terminal portion 13a protruding from the first unit 18a is joined to the first bus bar terminal portion 25a and the second coil terminal portion 13b protruding from the fourth unit 18d is joined to the second bus bar terminal portion 25b. Such welding is conducted by use of the torch 30 as shown in FIG. 6.

As above, the bus bar 25 connects the stator units 18 to each other. Even though not shown in FIG. 3, all the stator units 18 arranged in the stator 10 are electrically connected by bus bars 25.

Figure 7:
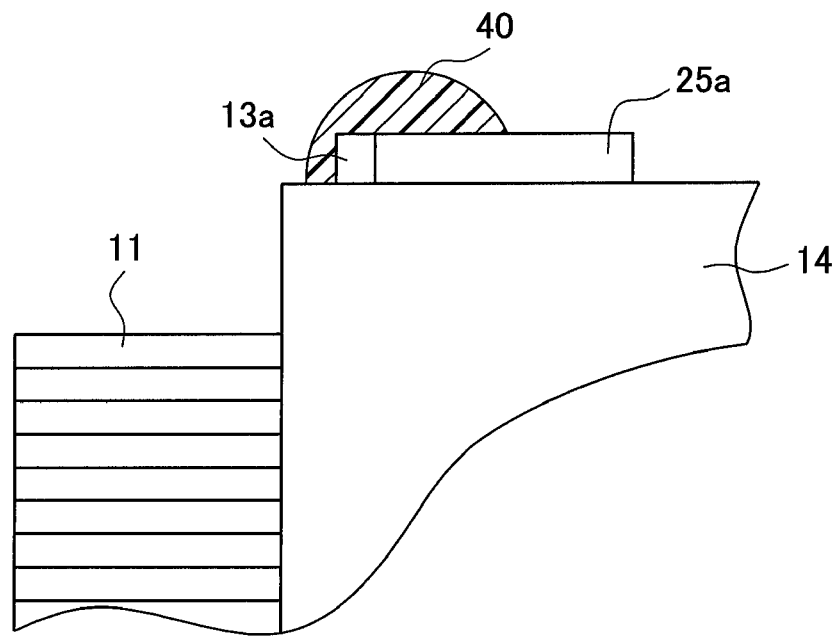
FIG. 7 is a side view showing a process following welding of the bus bar terminal portion in the first embodiment.

FIG. 7 is a side view showing a process following welding of the bus bar terminal portions.

After the first bus bar terminal portion 25a and the first coil terminal portion 13a are welded to each other, an insulating material 40 is potted by a potting machine not shown as shown in FIG. 7 to ensure insulation.

The insulating material 40 is an insulating resin material and is dropped in a molten state onto the first bus bar terminal portion 25a. When heated, the insulating material 40 spreads to cover over the terminal portion to complete a protection. As a result, as shown in FIG. 7, the welded portion between the first bus bar terminal portion 25a and the first coil terminal portion 13a is protected.

For potting the insulating material 40, it is preferable to use a masking jig having the same shape as the welding jig 35 to prevent the insulating material 40 from falling in drops onto an unnecessary portion.

The joining portion between the second coil terminal portion 13b and the second bus bar terminal portion 25b are also insulated by the insulating material 40.

Instead of using the insulating material 40, an insulating sheet 45 may be used for insulation.

Figure 8:
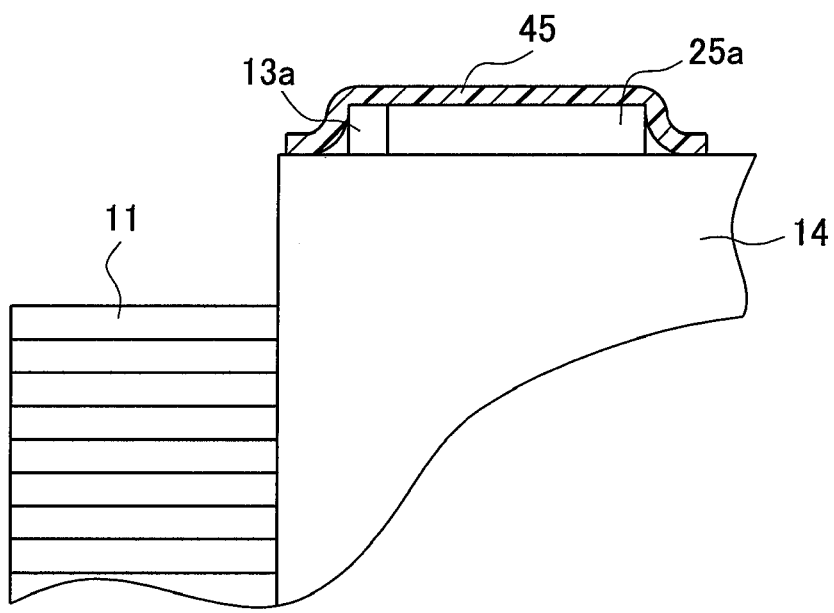
FIG. 8 is a side view of another example of the process following welding of the bus bar terminal portion in the first embodiment.

FIG. 8 is a side view of another example of the process following the welding of the bus bar terminal portion.

Specifically, instead of using the insulating material 40, an insulating method using the insulating sheet 45 as shown in FIG. 8 is conceivable. The insulating sheet 45 is a sheet with an inside surface applied with thermosetting insulating resin. This insulating sheet 45 is placed to cover the first coil terminal portion 13a and the first bus bar terminal portion 25a and then subjected to heating. The insulating sheet 45 is hardened when heated, thereby insulating the joining portion between the first coil terminal portion 13a and the first bus bar terminal portion 25a.

Further, the joining portion between the second coil terminal portion 13b and the second bus bar terminal portion 25b is similarly insulated by the insulating sheet 45.

The stator 10 in the first embodiment has the above configuration can provide the following operations and effects.

One advantage is that the coil end of the stator 10 can be reduced.

The stator 10 in the first embodiment includes, in the stator structure including the coil 13 mounted on the core part 11 and the resin-molded portion 14 made of insulating resin covering at least the end face of the core part 11 and the coil 13, the bus bar 25 joined to the first coil terminal portion 13a (the second coil terminal portion 13b) formed on the end of the coil 13. The bus bar 25 is arranged so that the wide surface 25A faces the end face 14a of the resin-molded portion 14.

Since the bus bar 25 for connection with the first coil terminal portion 13a (the second coil terminal portion 13b) is placed so that the wide surface 25A of the bus bar 25 faces the end face 14a of the resin-molded portion 14 formed in the coil end of the stator 10, shortening of the coil end of the stator 10 can be achieved.

This is because the wide surface 25A of the bus bar 25 is placed to face the end face 14a as shown in FIG. 4 and other figures.

As shown in conventional arts, if the side surface 25B is placed to face the end face 14a, the coil end needs the height corresponding to the wide surface 25A. In contrast, in the first embodiment, the wide surface 25A is laid to face the end face 14, thus providing a shorter coil end.

Shortening of the coil end of the stator 10 can also contribute to saving of the insulating material 40 or the insulating sheet 45 for insulating the first coil terminal portion 13a and the first bus bar terminal portion 25a or the second coil terminal portion 13b and the second bus bar terminal portion 25b after joining as shown in FIGS. 7 and 8.

Since the length of the first coil terminal portion 13a can also be shortened, the conductor for forming the coil 13 can be saved.

Consequently, this configuration contributes to cost reduction of the stator 10.

Another advantage is that the heat generated when the first coil terminal portion 13a (the second coil terminal portion 13b) of the stator 10 and the first bus bar terminal portion 25a (the second bus bar terminal portion 25b) are welded to each other can be dissipated efficiently.

In the stator 10 in the first embodiment, the resin-molded portion 14 is made of a resin material having high heat conductivity. The surface of the first bus bar terminal portion 25a (the second bus bar terminal portion 25b) formed in both ends of the bus bar 25 is in surface contact with the end face 14a of the resin-molded portion 14 in the vicinity of at least the engagement portion with the first coil terminal portion 13a (the second coil terminal portion 13b).

Since the first bus bar terminal portion 25a is in contact with the end face 14a as shown in FIG. 6, the heat H generated in welding the first coil terminal portion 13a (the second coil terminal portion 13b) and the first bus bar terminal portion 25a (the second bus bar terminal portion 25b) will promptly dissipate into the resin-molded portion 14. The same applies to the second bus bar terminal portion 25b.

Figure 9:
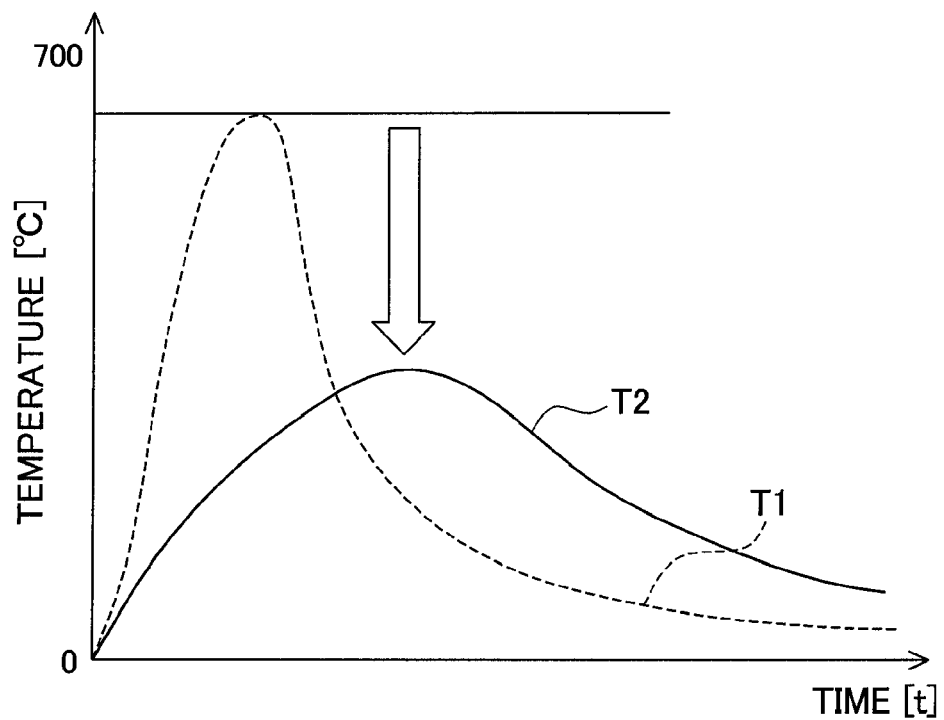
FIG. 9 is a graph showing a relationship between a temperatures of a terminal portion and an elapsed time during welding in the first embodiment.

FIG. 9 is a graph showing a relationship between a temperature of the terminal portion and an elapsed time during welding. A vertical axis indicates the temperature of the terminal portion. A lateral axis represents the elapsed time t. Welding between the first coil terminal portion 13a and the first bus bar terminal portion 25a starts from an elapsed time 0. A condition after welding is also shown.

A conventional terminal temperature T1 indicates the temperature of the first coil terminal portion (13a) in the conventional art. A terminal temperature T2 in the first embodiment indicates the temperature of the first coil terminal portion (13a) in the first embodiment.

The first coil terminal portion (13a) with the conventional terminal temperature T1 is welded to the first bus bar terminal portion 25a without bending similar to the first coil terminal portion 13a with the first-embodiment terminal temperature T2. Accordingly, a peak temperature of the temperature T1 during welding becomes high as shown in FIG. 9.

Since the first coil terminal portion 13a and the first bus bar terminal portion 25a protrude in an axial direction of the stator 10, heat dissipation depends on heat transfer to a base side of the first coil terminal portion 13a and from the first bus bar terminal portion 25a to the bus bar body portion 25c and heat transfer to ambient air.

However, the cross sectional areas of the first coil terminal portion 13a and the first bus bar terminal portion 25a are not sufficient to transmit the heat during welding. Transfer of this heat is poorer than heat transfer between solid substances.

On the other hand, regarding to the first-embodiment terminal temperature T2, the first bus bar terminal portion 25a and the end face 14a are in surface contact with each other, the heat generated during welding can be dissipated in the end face 14a. Since the resin-molded portion 14 has a relatively large heat capacity and is made of resin having high heat conductivity, the peak temperature occurring during welding can be reduced as shown in FIG. 9.

According to the investigations by the applicant, the conventional terminal temperature T1 and the first-embodiment terminal temperature T2 are different in peak temperature by about two times.

As a result, it is expected that a peak temperature is as low as an allowable temperature limit of the insulating material 40. Thus, the insulating material 40 is less likely to suffer damage by the heat during welding. The insulating coating of the first coil terminal portion 13a is also less likely to suffer damage by the heat.

The first coil terminal portion 13a is required only to protrude from the end face 14a of the resin-molded portion 14 by an amount that allows welding with the first bus bar terminal portion 25a. In other words, as long as the first coil terminal portion 13a protrudes by a length corresponding to almost the width of the side surface 25B, the first coil terminal portion 13a can be welded to the first bus bar terminal portion 25a. The same applies to the second coil terminal portion 13b.

As a result, the length of the first coil terminal portion 13a can be shortened. This is because it is unnecessary to make the first coil terminal portion 13a long, which would be necessary to avoid damage to the insulating coating of the coil 13 by the heat during welding as indicated in the aforementioned problem to be solved.

That is, because of shortening of the first coil terminal portion 13a, a material cost can be reduced. Further, a portion coated after welding can be reduced and thus the amount of material for the insulating material 40 or the insulating sheet 45 used for coating can be reduced.

This configuration can contribute to cost reduction of the stator 10.

A second embodiment of the invention will be explained below.

Second Embodiment

The second embodiment is substantially the same in structure as the first embodiment excepting that the body portion 25c of the bus bar 25 is bonded to the end face 14a. The following explanation is given to the effects thereof.

In the structure of the second embodiment, the adhesive 19 is also applied between the end face 14a and the surface of the body portion 25c of the bus bar 25 which will contact with the end face 14a. Specifically, almost the entire area of one surface of the bus bar 25 is bonded to the end face 14a of the resin-molded portion 14.

In a state shown in FIG. 3, the bus bar 25 is bonded to the end face 14a of the resin-molded portion 14 with the adhesive 19. At that time, it is preferable that no gaps are present between the surface of the body portion 25c and the end face 14a.

The second embodiment having the above configuration can provide the following operations and effects.

One advantage is that the heat generated during welding between the first coil terminal portion 13a and the first bus bar terminal portion 25a and also the heat releasing to the bus bar 25 can dissipate into the resin-molded portion 14.

Figure 10:
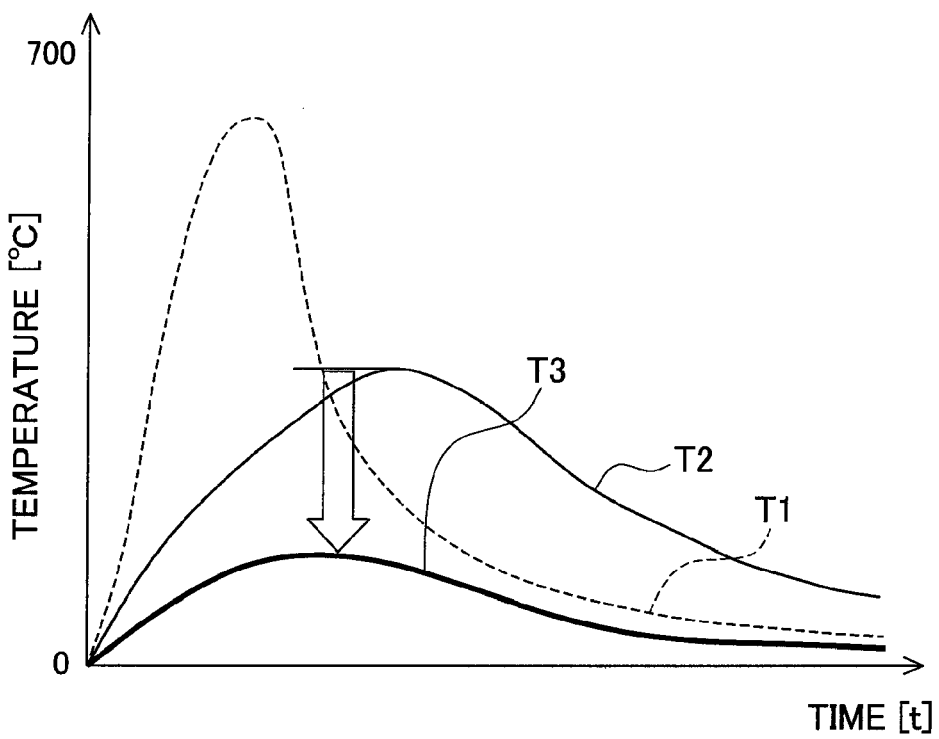
FIG. 10 is a graph showing a relationship between a temperature of a terminal portion and an elapsed time during welding in a second embodiment.

FIG. 10 is a graph showing a relationship between a temperature of the terminal portion during welding and an elapsed time t in the second embodiment.

A vertical axis and a lateral axis indicate the same as in FIG. 9. The conventional terminal temperature T1 represents the temperature of the first coil terminal portion 13a in the conventional art. Further, the first-embodiment terminal temperature T2 represents the first coil terminal portion 13a in the first embodiment. A second-embodiment terminal temperature T3 represents the temperature of the first coil terminal portion 13a in the second embodiment.

The second-embodiment terminal temperature T3 has a peak temperature lower by about half the first-embodiment terminal temperature T2. This is because not only the first bus bar terminal portion 25a and the second bus bar terminal portion 25b of the bus bar 25 but also the body portion 25c is surface joined to the end face 14a, so that the heat dissipation is improved more than in the stator 10 in the first embodiment.

When the first coil terminal portion 13a and the first bus bar terminal portion 25a are welded to each other, the heat applied to the first bus bar terminal portion 25a is directly transferred to the resin-molded portion 14 because the wide surface 25A is in surface joined to the end face 14a with the adhesive 19, and further the heat to be transferred from the first bus bar terminal portion 25a to the bus bar body portion 25c of the bus bar 25 is also transferred to the resin-molded portion 14. Of course, the same applies to the welding with the second bus bar terminal portion 25b.

Accordingly, since the heat dissipation area of the heat generated during welding is increased and the heat capacity of the resin-molded portion 14 is sufficient, the peak temperature during welding can be lowered.

A third embodiment of the invention will be explained below.

Third Embodiment

The third embodiment is almost the same in structure as the first embodiment excepting the shape of the first bus bar terminal portion 25a and the length of the first coil terminal portion 13a. The following explanation is given thereto.

Figure 11:
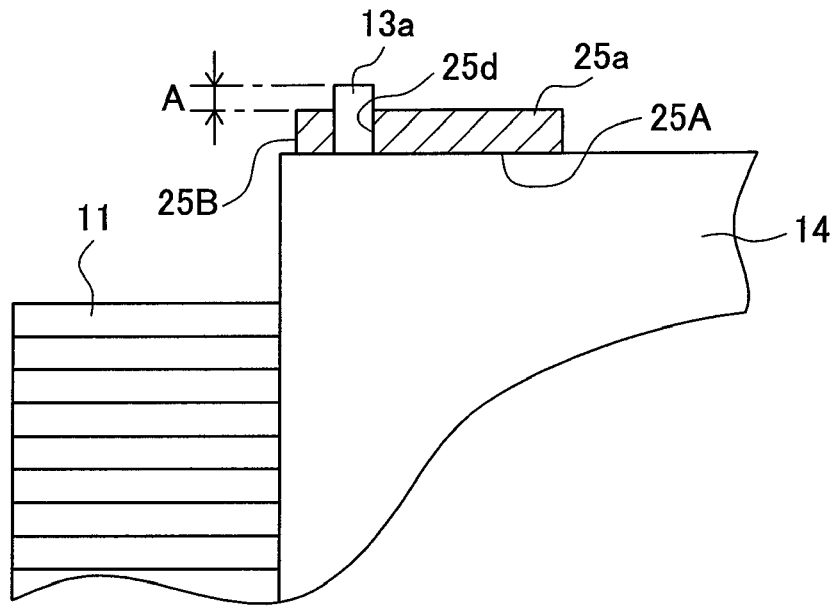
FIG. 11 is a side view to explain a joining portion between a bus bar terminal portion and a coil terminal portion in a third embodiment.

FIG. 11 is a side view to explain a joining portion between a bus bar terminal portion and a coil terminal portion in the third embodiment.

Figure 12:
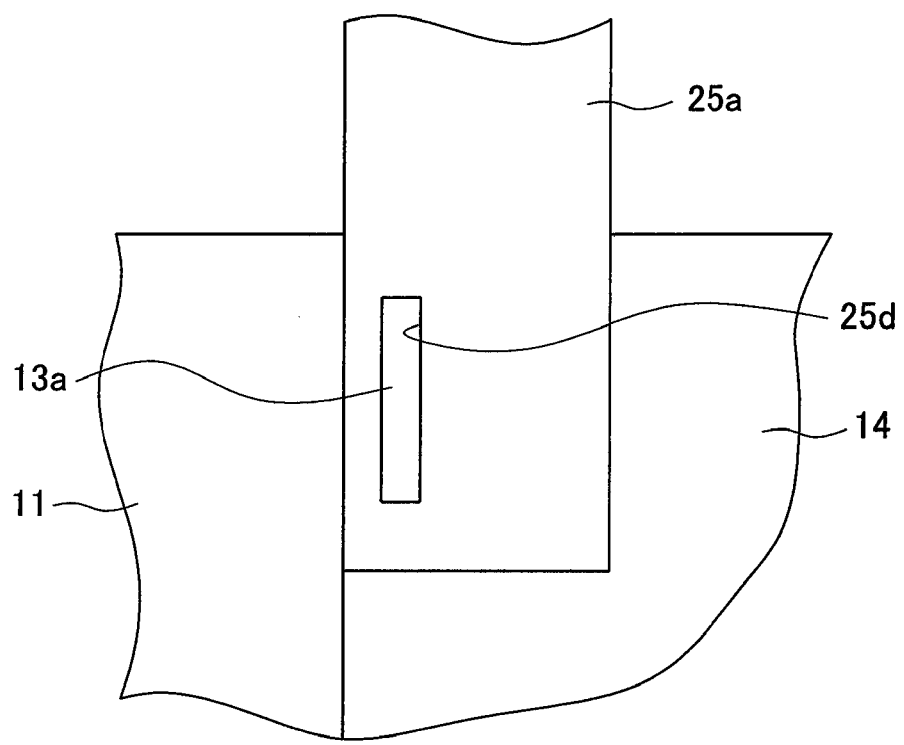
FIG. 12 is a top view to explain the joining portion between the bus bar terminal portion and the coil terminal portion in the third embodiment.

FIG. 12 is a top view to explain the joining portion between the bus bar terminal portion and the coil terminal portion.

The third embodiment is different from the first embodiment in that a slit 25d is formed in the first bus bar terminal portion 25a of the bus bar 25.

The slit 25d is a through hole formed through the first bus bar terminal portion 25a and has a size allowing engagement with the first coil terminal portion 13a.

The sizes of the first coil terminal portion 13a and the slit 25d are preferably determined exactly or strictly if positioning accuracy is required. However, because they are finally welded, those sizes may be set relatively rough without causing problems. They should be determined according to design specification.

The bus bar 25 is attached to the stator 10 in such a way that the first coil terminal portion 13a and the second coil terminal portion 13b are inserted respectively in the slits 25d.

Herein, as shown in FIG. 11, the first coil terminal portion 13a and the second coil terminal portion 13b are designed to protrude by a length A from the width of the side surface 25B of the bus bar 25. This length A is set to about 2 mm.

Figure 13:
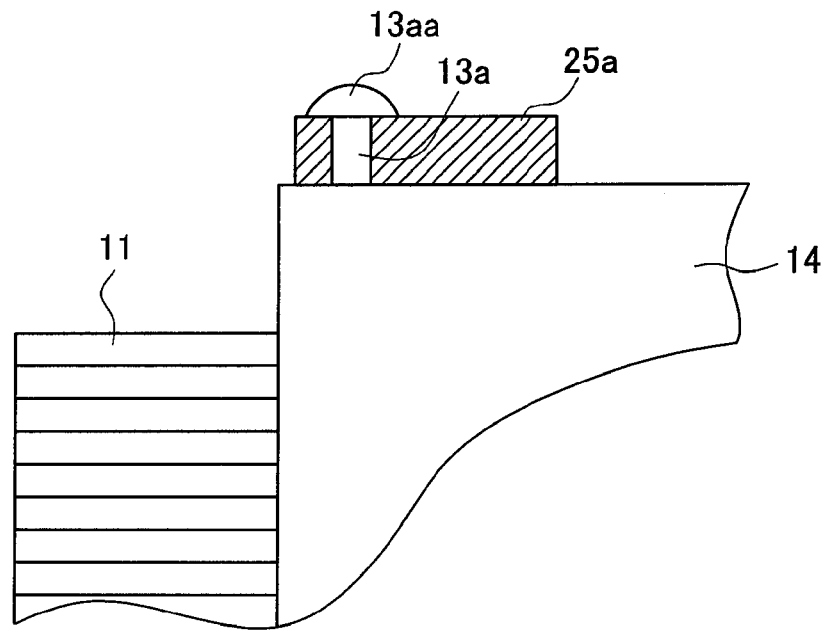
FIG. 13 is a side view to explain a manner of the bus bar terminal portion and the coil terminal portion after welding in the third embodiment.

When the bus bar 25 is placed as shown in FIGS. 11 and 12 and then welded by the torch 30 not shown, the distal end of the first coil terminal portion 13a is melted, forming a melted portion 13aa as shown in FIG. 13. Even though the melted portion 13aa is illustrated in a simple form in FIG. 13, the melted portion 13aa is actually welded and thus mixed with the surface of the first bus bar terminal portion 25a.

The stator 10 in the third embodiment configured as above can provide the following operations and effects.

One advantage is that positioning of the bus bar 25 can be easily performed.

In the stator 10 in the third embodiment, the first bus bar terminal portion 25a (the second bus bar terminal portion 25b) of the bus bar 25 is formed with the slit 25d engageable with the first coil terminal portion 13a (the second coil terminal portion 13b) of the coil 13. The first coil terminal portion 13a (the second coil terminal portion 13b) is inserted in the slit 25d.

The bus bar 25 is positioned in place on the end face 14 by inserting the first coil terminal portion 13a and the second coil terminal portion 13b respectively into the slits 25d.

This eliminates the need for positioning in welding, resulting in merits such that any positioning jig is unnecessary.

For the purpose of positioning, the shape of each slit 25d is not limited to the square passing through the bus bar 25 shown in FIG. 12. For instance, the slit shape may be selected from an angular U-shaped cutout shape opening at each end of the bus bar 25, a slit shape opening on an inner periphery side or an outer periphery side of the stator 10, or a slit shape designed such that a slit in the first bus bar terminal portion 25a opens on the inner periphery side of the stator 10 while a slit in the second bus bar terminal portion 25b opens on the outer periphery side of the stator 10.

As another advantage, since the bus bar 25 is formed with the slits 25d, it can protect the end face 14a from sparks and heat generated during welding.

Welding is applied to a protruding portion of the first coil terminal portion 13a or the second coil terminal portion 13b. The bus bar 25 has such a shape as to cover the surrounding area of the first coil terminal portion 13a or the second coil terminal portion 13b. Even when welding is performed with the torch 30 as shown in FIG. 6, therefore, the end face 14a is not exposed on the torch 30 side. Accordingly, the end face 14 can be protected from sparks and heat that directly occurs. It is undesirable to directly expose the resin-molded portion 14 made of resin to sparks and heat.

The first bus bar terminal portion 25a is bonded to the end face 14a with the adhesive 19. Thus, the heat generated during welding will promptly dissipate into the resin-molded portion 14 as in the first embodiment. Accordingly, the peak temperature of the heat generated in the first coil terminal portion 13a or the second coil terminal portion 13b during welding can be reduced as shown in FIG. 9.

Further, the melted portion 13aa is formed in the distal end of the first coil terminal portion 13a during welding. Accordingly, the bus bar 25 is less likely to come off the first coil terminal portion 13a. The same applies to the second coil terminal portion 13b.

As above, the bus bar 25 can be held with higher strength in the stator 10.

A fourth embodiment of the invention will be explained below.

Fourth Embodiment

A stator 10 in the fourth embodiment is different from that in the first embodiment in the shape of the first coil terminal portion 13a or the second coil terminal portion 13b and a method of welding the first coil terminal portion 13a or the second coil terminal portion 13b to the bus bar 25. The differences are explained below.

Figure 15:
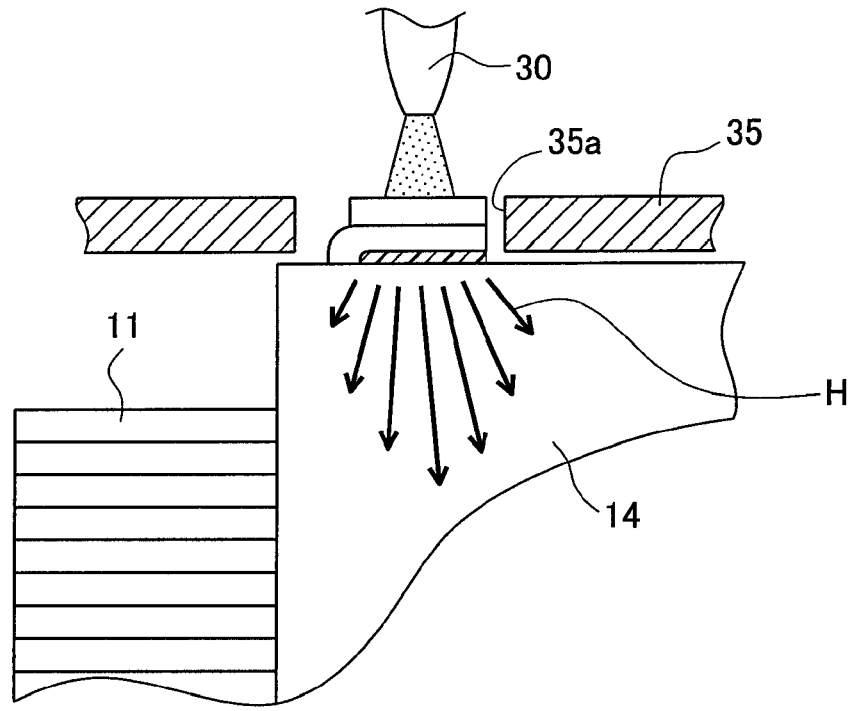
FIG. 15 is a side view to explain a manner of welding the bus bar terminal portion and the coil terminal portion during welding in the fourth embodiment.
Figure 16:
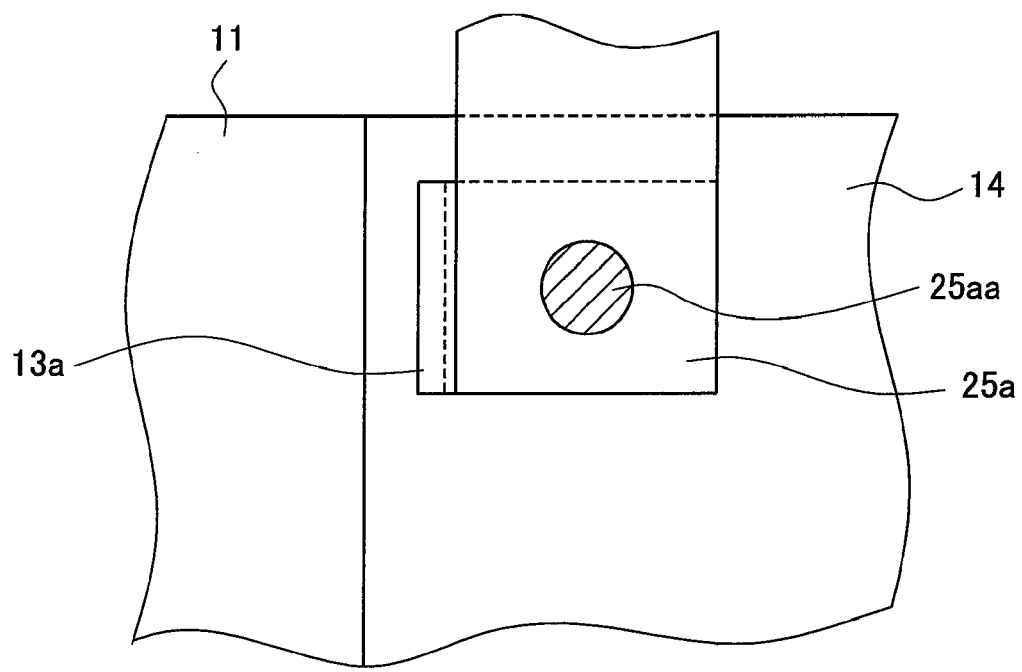
FIG. 16 is a top view to explain the joining portion between the bus bar terminal portion and the coil terminal portion in the fourth embodiment.

FIG. 14 is a side view to explain a joining portion between the bus bar terminal portion and the coil terminal portion in the fourth embodiment. FIG. 15 is a side view to explain a manner of welding the bus bar terminal portion and the coil terminal portion. FIG. 16 is a top view to explain the joining portion between the bus bar terminal portion and the coil terminal portion.

The first coil terminal portion 13a and the second coil terminal portion 13b of the coil 13 in the fourth embodiment are configured in such a way that, after the coil 13 is fitted on the core part 11 and then the resin-molded portion 14 is formed, the first coil terminal portion 13a and the second coil terminal portion 13b of the coil 13 are bent so as to contact with the end face of the resin-molded portion 14.

The first coil terminal portion 13a is bent as shown in FIG. 14 to contact with the end face 14a of the resin-molded portion 14. At that time, a portion of the end face 14a of the resin-molded portion 14 which will contact with the first coil terminal portion 13a has been applied with the adhesive 19. Therefore, the first coil terminal portion 13a, when bent, is bonded without gaps to the end face 14a of the resin-molded portion 14 with the adhesive 19. It is preferable that no gaps are present between the end face 14a and the surface of the first coil terminal portion 13a and that the adhesive 19 is an adhesive having high heat conductivity.

The first bus bar terminal portion 25a is formed with a welding hole 25aa at the center as shown in FIG. 16. When the bus bar terminal portion 25a is to be welded to the first coil terminal portion 13a, the torch 30 is used to weld the surrounding area of the welding hole 25aa and the surface of the first coil terminal portion 13a. For welding, the welding jig 35 is used. The welding jig 35 includes a disk plate formed with a through hole 35a in a position above a position in which the first bus bar terminal portion 25a or the second bus bar terminal portion 25b is to be placed. With the torch 30, the first coil terminal portion 13a and the first bus bar terminal portion 25a are welded to each other though the through hole 35a.

Welding between the first coil terminal portion 13a and the first bus bar terminal portion 25a is performed as above. Similarly, welding between the second coil terminal portion 13b and the second bus bar terminal portion 25b is also conducted.

Even though explanation is omitted, the bus bar 25 is held by a jig not shown during welding.

Figure 17:
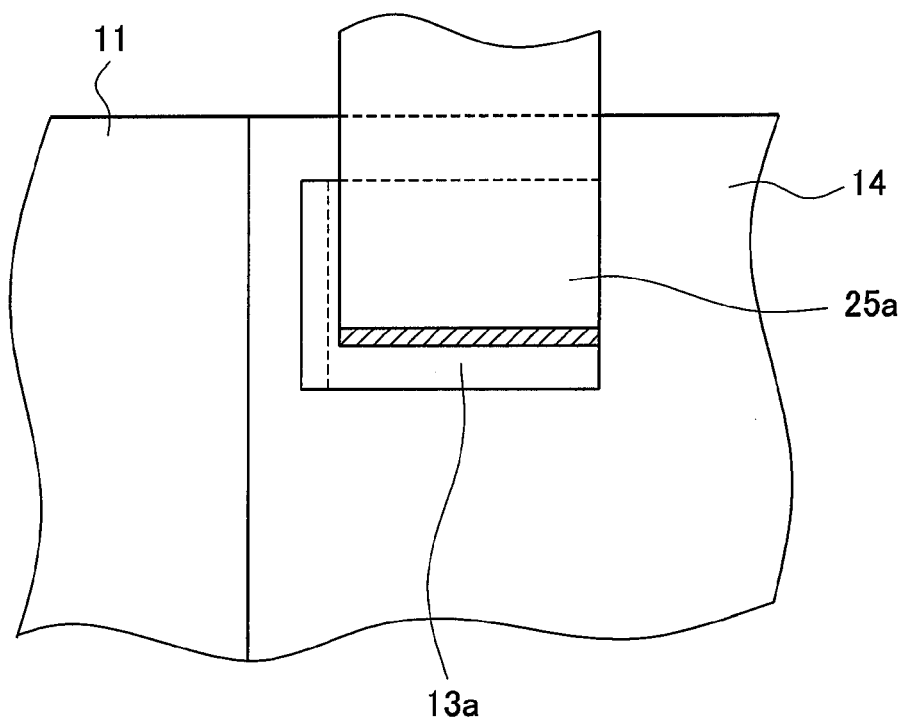
FIG. 17 is a top view to explain another example of the joining portion between the bus bar terminal portion and the coil terminal portion in the fourth embodiment.

FIG. 17 is a top view to explain another example of the joining portion between the bus bar terminal portion and the coil terminal portion. As an alternative, it is conceivable to arrange the first coil terminal portion 13a and the first bus bar terminal portion 25a with displacement from each other as shown in FIG. 17 without providing the welding hole 25aa in the first bus bar terminal portion 25a. Since it is necessary to place the welding jig 35 to prevent the resin-molded portion 14 and the core part 11 from becoming subjected to direct scattering of the heat and sparks generated during welding, the torch 30 has to be moved toward the first coil terminal portion 13a and the first bus bar terminal portion 25a in an axial direction of the stator 10. Accordingly, the shape of the first bus bar terminal portion 25a is determined so that the surface of the first coil terminal portion 13a and the surface of the first bus bar terminal portion 25a are both visible when viewed from top in the axial direction of the stator 10. Any other shapes than those in FIGS. 16 and 17 may also be adopted.

The first coil terminal portion 13a protruding from the first unit 18a is joined to the first bus bar terminal portion 25a and the second coil terminal portion 13b protruding from the fourth unit 18d is joined to the second bus bar terminal portion 25b. Respective joining conditions are almost the same as that shown in FIG. 3 in the first embodiment. Joining is performed by welding using the torch 30 as shown in FIG. 15.

As above, the bus bar 25 connects the stator units 18 to each other. Even though not shown in the figure, all the stator units 18 arranged in the stator 10 are electrically connected by bus bars 25.

Figure 18:
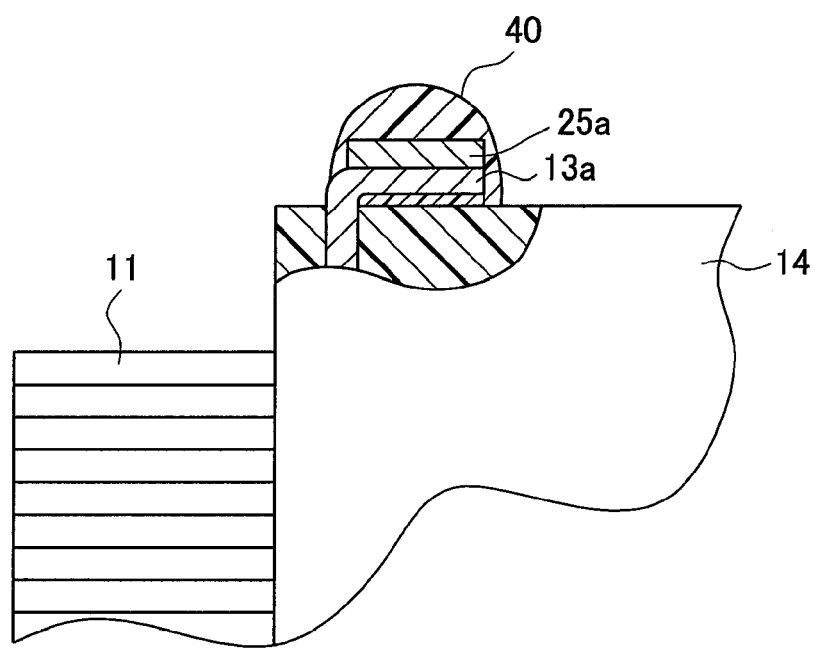
FIG. 18 is a side view showing a process following welding of the bus bar terminal portion in the fourth embodiment.

FIG. 18 is a side view showing a process following welding of the bus bar terminal portion.

The first coil terminal portion 13a welded to the first bus bar terminal portion 25a is subjected to potting of the insulating material 40 by the potting machine not shown as shown in FIG. 18 to ensure insulation.

The insulating material 40 is an insulating resin material and is dropped in a molten state onto the first bus bar terminal portion 25a. When heated, the insulating material 40 spreads to cover over the terminal portion to complete a protection. As a result, as shown in FIG. 18, the welded portion between the first bus bar terminal portion 25a and the first coil terminal portion 13a are protected.

For potting the insulating material 40, it is preferable to use a masking jig having the same shape as the welding jig 35 to prevent the insulating material 40 from falling in drops onto an unnecessary portion.

Further, the joining portion between the second coil terminal portion 13b and the second bus bar terminal portion 25b are also insulated by the insulating material 40.

Instead of using the insulating material 40, an insulating sheet 45 may be used for insulation.

Figure 19:
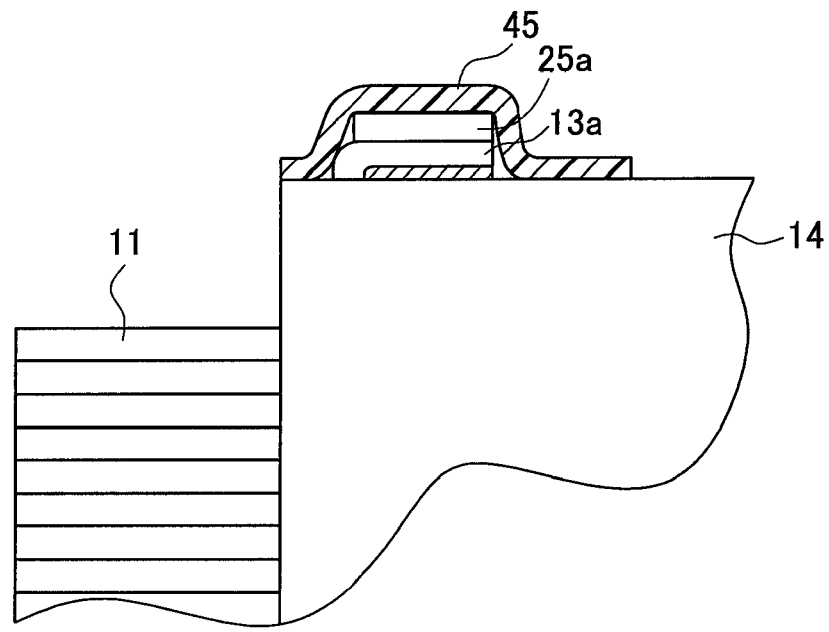
FIG. 19 is a side view of another example of the process following welding of the bus bar terminal portion in the fourth embodiment.

FIG. 19 is a side view of another example of the process following the welding of the bus bar terminal portion.

Specifically, instead of using the insulating material 40, an insulating method using the insulating sheet 45 as shown in FIG. 19 is conceivable. The insulating sheet 45 is a sheet with an inside surface applied with thermosetting insulating resin. This insulating sheet 45 is placed to cover the first coil terminal portion 13a and the first bus bar terminal portion 25a and then subjected to heating. The insulating sheet 45 is hardened when heated, thereby insulating the joining portion between the first coil terminal portion 13a and the first bus bar terminal portion 25a.

Further, the joining portion between the second coil terminal portion 13b and the second bus bar terminal portion 25b is similarly insulated by the insulating sheet 45.

The stator 10 in the first embodiment has the above configuration can provide the following operations and effects.

As one advantage, the heat generated during welding between the coil terminal portion and the bus bar terminal portion can be efficiently dissipated.

The stator 10 in the fourth embodiment is configured such that the resin-molded portion 14 is made of a resin material having high heat conductivity, the first coil terminal portion 13a (the second coil terminal portion 13b) is bent toward the coil 13 side so that the surface of the first coil terminal portion 13a (the second coil terminal portion 13b) is in contact with end face 14a of the resin-molded portion 14.

When the first coil terminal portion 13a and the first bus bar terminal portion 25a are to be joined, the first coil terminal portion 13a has been in contact with the end face 14a of the resin-molded portion 14 and hence the weld heat H will rapidly dissipate as shown in FIG. 15 during welding.

Because the first coil terminal portion 13a is in surface contact with the end face 14a and the adhesive 19 is used, there is little clearance or gap between the first coil terminal portion 13a and the end face 14a. Therefore, it is in an excellent heat conductive state. The peak temperature as shown in FIG. 9 can be reduced accordingly.

It is expected that the peak temperature is as low as the allowable temperature limit of the insulating material 40. Accordingly, the insulating material 40 is less likely to suffer damage by the heat during welding. Similarly, an insulating coating of the first coil terminal portion 13a is less likely to suffer damage by the heat.

Since the first coil terminal portion 13a is bent, the length of the coil end of the stator 10 is shorter than in the conventional art.

Accordingly, the length of the first coil terminal portion 13a can be shorter. This is because the first coil terminal portion 13a does not have to be long enough to avoid damage of the heat to the insulating coating of the coil 13 during welding, as mentioned in the problems to be solved by the invention.

In other words, shortening of the first coil terminal portion 13a can lead to a reduction in material costs. Further, a portion to be coated after welding can be reduced. This can also reduce the material of the insulating material 40 or the insulating sheet 45 if it is used for coating.

That is, a cost reduction of the stator 10 can be achieved.

A fifth embodiment of the invention will be explained below.

Fifth Embodiment

The fifth embodiment is almost identical in structure to the first embodiment excepting nonuse of the adhesive 19 and the first coil terminal portion 13a. These are explained below.

Figure 20:
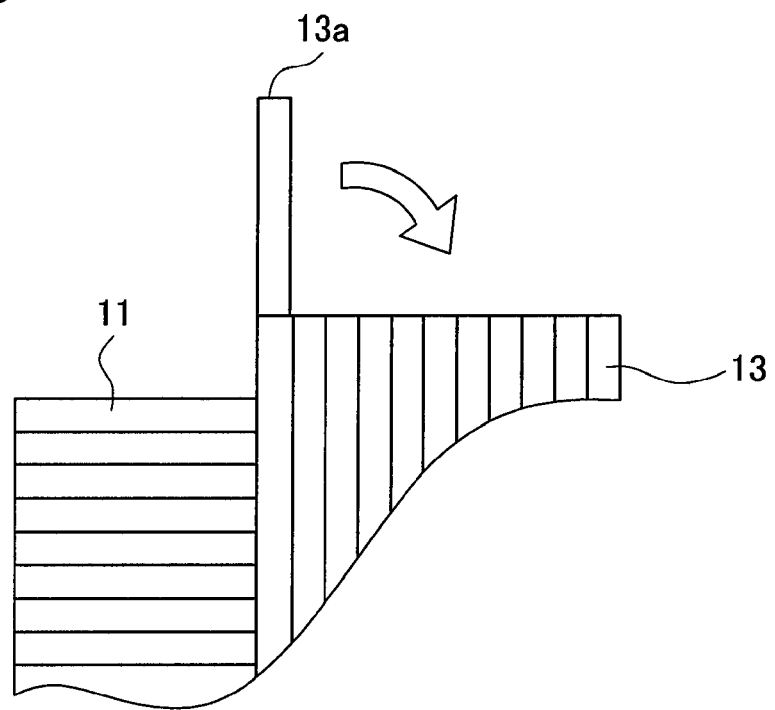
FIG. 20 is a side view showing a manner of bending a coil terminal portion to be formed in a coil in a fifth embodiment.
Figure 21:
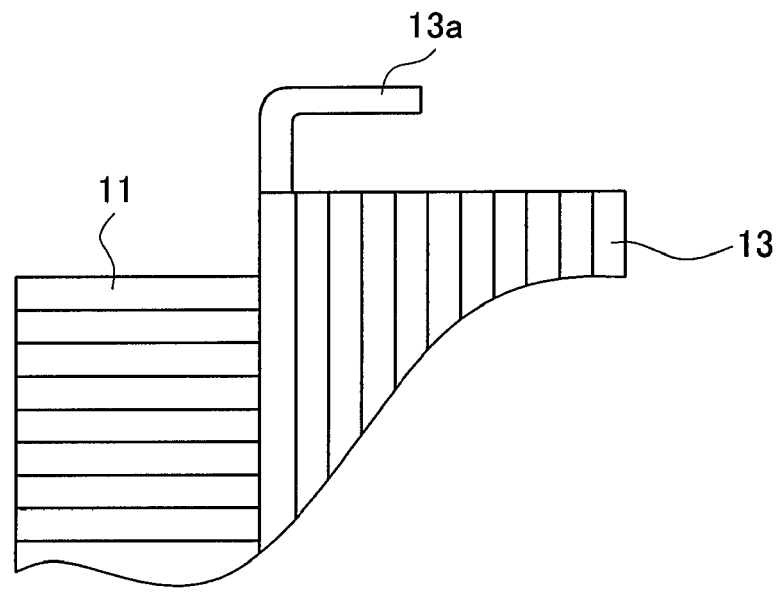
FIG. 21 is a side view showing a completely bent coil terminal portion in the fifth embodiment.
Figure 22:
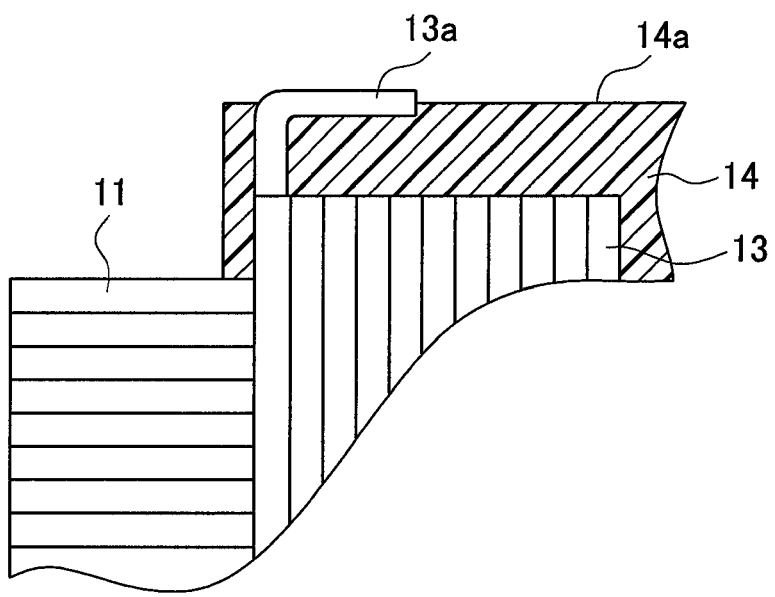
FIG. 22 is a partial cross sectional view of a stator with a coil molded with resin in the fifth embodiment.

FIG. 20 is a side view showing a manner of bending a coil terminal portion of a coil in the fifth embodiment. FIG. 21 is a side view showing the coil terminal portion in a bent state. FIG. 22 is a partial cross sectional view of a stator in which the coil is resin-molded.

The coil 13 in the third embodiment is fitted on a teeth portion not shown formed in the core part 11, and then the first coil terminal portion 13a is bent as shown in FIG. 20. Similarly, the second coil terminal portion 13b is also bent.

After the first coil terminal portion 13a is formed as shown in FIG. 21, the resin-molded portion 14 is formed by use of an insulating resin material as shown in FIG. 22.

At that time, the resin-molded portion 14 is formed so that a part of the first coil terminal portion 13a protrudes from the surface of the end face 14a, that is, the surface of the first coil terminal portion 13a facing the coil 13 is embedded in the resin-molded portion 14. Accordingly, the surface of the first coil terminal portion 13a located on the coil 13 side is in surface contact with the resin-molded portion 14.

The stator 10 in the fifth embodiment configured as above can provide the following operations and effects.

One advantage is that the adhesive 19 does not have to be used.

In the fifth embodiment, in the stator manufacturing method to form the stator 10 by fitting the coil 13 on the core part 11, resin-molding the core part 11 together with the coil 13 to form the resin-molded portion 14, thereby forming the stator 10, the first coil terminal portion 13a (the second coil terminal portion 13b) formed at an end of the coil 13 is bent toward the coil 13 side and the coil 13 and the core part 11 are resin molded. Thus, the resin-molded portion 14 is formed so that one surface of the first coil terminal portion 13a (the second coil terminal portion 13b) facing the coil 13 side is embedded in the resin molded portion 14, while the other surface of the first coil terminal portion 13a (the second coil terminal portion 13b) protrudes outside from the resin-molded portion 14. Of the coils 3 arranged in the core parts 11, the first coil terminal portion 13a of the first unit 18a is engaged with one end of the bus bar 25, the second coil terminal portion 13b of the fourth unit 18d is engaged with the other end of the bus bar 25, thereby forming the stator 10.

Unlike the fourth embodiment, consequently, the joining between the first coil terminal portion 13a and the first bus bar terminal portion 25a and between the second coil terminal portion 13b and the second bus bar terminal portion 25b can ensure contact strength without the adhesive 19.

Further, the contact area between the first coil terminal portion 13a and the resin-molded portion 14 can be increased but slightly and thus the heat dissipation efficiency can be enhanced more than in the first embodiment.

The present invention is explained above along the embodiments but is not limited thereto. The invention may be embodied in other specific forms without departing from the essential characteristics thereof.

For instance, the coil 13 in the first through fifth embodiments is formed of a flat rectangular conductor in a wound shape, but it may be a coil formed of a wire having a circular cross section. Although the embodiments use the split type core part 11, the invention is applicable to any other types than the split type.

Although welding is adopted as the method of joining the first coil terminal portion 13a and the second coil terminal portion 13b of the coil 13 with the bus bar 25, any other joining methods may be adopted, such as brazing and electron beam welding.

DESCRIPTION OF THE REFERENCE SIGNS

10 Stator
11 Stator core part
11a Teeth portion
12 Insulator
13 Coil
13a First coil terminal portion
13b Second coil terminal portion
14 Resin-molded portion
15 Outer ring
16 Bus bar holder
18 Split-type stator unit
25 Bus bar
25a First bus bar terminal portion
25b Second bus bar terminal portion
25c Bus bar body portion

The invention claimed is:

1. A stator structure comprising:
a coil mounted on a stator core part; and
a molded portion made of insulating resin that covers at least an end face of the stator core part and an outer periphery of the coil, wherein
the stator structure includes a bus bar welded to a coil terminal portion formed in an end portion of the coil,
the bus bar is placed so that a wide surface of the bus bar faces the end face of the stator core, and
the coil terminal portion and a bus bar terminal portion formed in each end portion of the bus bar are welded to each other while a surface of the bus bar terminal portion is in surface contact with a surface of the molded portion near where the bus bar terminal portion and the coil terminal portion are welded to each other, and
the coil terminal portion protrudes from an end face of the molded portion by a length corresponding to a width of a side surface of the bus bar.

2. The stator structure according to claim 1, wherein the molded portion is made of a resin material.

3. The stator structure according to claim 2, wherein the bus bar terminal portion of the bus bar is formed with a slit engageable with the coil terminal portion of the coil, and
the coil terminal portion is inserted in the slit.

4. The stator structure according to claim 3, wherein a surface of a bus bar body portion joining the bus bar terminal portions formed in both ends of the bus bar is in surface contact with the surface of the molded portion.

5. The stator structure according to claim 2, wherein a surface of a bus bar body portion joining the bus bar terminal portions formed in both ends of the bus bar is in surface contact with the surface of the molded portion.

6. The stator structure according to claim 1, wherein
the molded portion is made of a resin material, and
the coil terminal portion is bent toward the coil and a surface of the coil terminal portion is in surface contact with the surface of the molded portion.

7. The stator structure according to claim 6, wherein a surface of a bus bar body portion joining the bus bar terminal portions formed in both ends of the bus bar is in surface contact with the surface of the molded portion.

8. The stator structure according to claim 1, wherein
the bus bar terminal portion of the bus bar is formed with a slit engageable with the coil terminal portion of the coil, and
the coil terminal portion is inserted in the slit.

9. The stator structure according to claim 8, wherein a surface of a bus bar body portion joining the bus bar terminal portions formed in both ends of the bus bar is in surface contact with the surface of the molded portion.

10. The stator structure according to claim 1, wherein a surface of a bus bar body portion joining the bus bar terminal portions formed in both ends of the bus bar is in surface contact with the surface of the molded portion.

* * * * *